United States Patent [19]

Task et al.

[11] 4,370,024
[45] Jan. 25, 1983

[54] DYNAMIC BINARY FOURIER FILTERED IMAGING SYSTEM

[75] Inventors: Harry L. Task, Montgomery County, Ohio; John F. Courtright, Windcrest, Tex.; Casimer K. Salys, Centerville, Ohio

[73] Assignee: The United States of America as represented by the Secretary of the Air Force, Washington, D.C.

[21] Appl. No.: 147,417

[22] Filed: May 6, 1980

[51] Int. Cl.$^3$ ............................................. G02B 5/18
[52] U.S. Cl. ............................... 350/162.12; 250/550
[58] Field of Search ................... 350/162 SF; 356/71; 250/550

[56] References Cited

U.S. PATENT DOCUMENTS 4,207,370  6/1980  Liu ............................... 350/162 SF

OTHER PUBLICATIONS

Bleha, W. P. et al., "Application of the Liquid Crystal Light Valve to Real-Time Optical Data Processing", Optical Engineering, vol. 17, No. 4, Jul.-Aug. 1978, pp. 371-384.

Jenkins et al., *Fundamentals of Optics*, Third Edition, p. 491, McGraw-Hill, N.Y., 1957.

*Primary Examiner*—John K. Corbin
*Assistant Examiner*—Bruce Y. Arnold
*Attorney, Agent, or Firm*—Donald J. Singer; Casimer K. Salys

[57] ABSTRACT

An apparatus for altering the spatial frequency content of recorded patterns by selectively filtering the patterns after they are transformed into the Fourier domain. The filter characteristics are spatially and temporally variable while the real space image of the altered pattern is being observed. A laser beam is projected through a transparency containing the pattern. The patterned beam, with diffraction interference effects, is transformed to the Fourier domain at the surface of a liquid crystal light valve responsive to a spatially and temporally varying light projector. The projector activated regions reflect areas of the Fourier domain beam, while other areas are absorbed or incoherently reflected. A beam splitter redirects a portion of the reflected beam to a continuously observable image plane after transformation back into real space.

1 Claim, 5 Drawing Figures

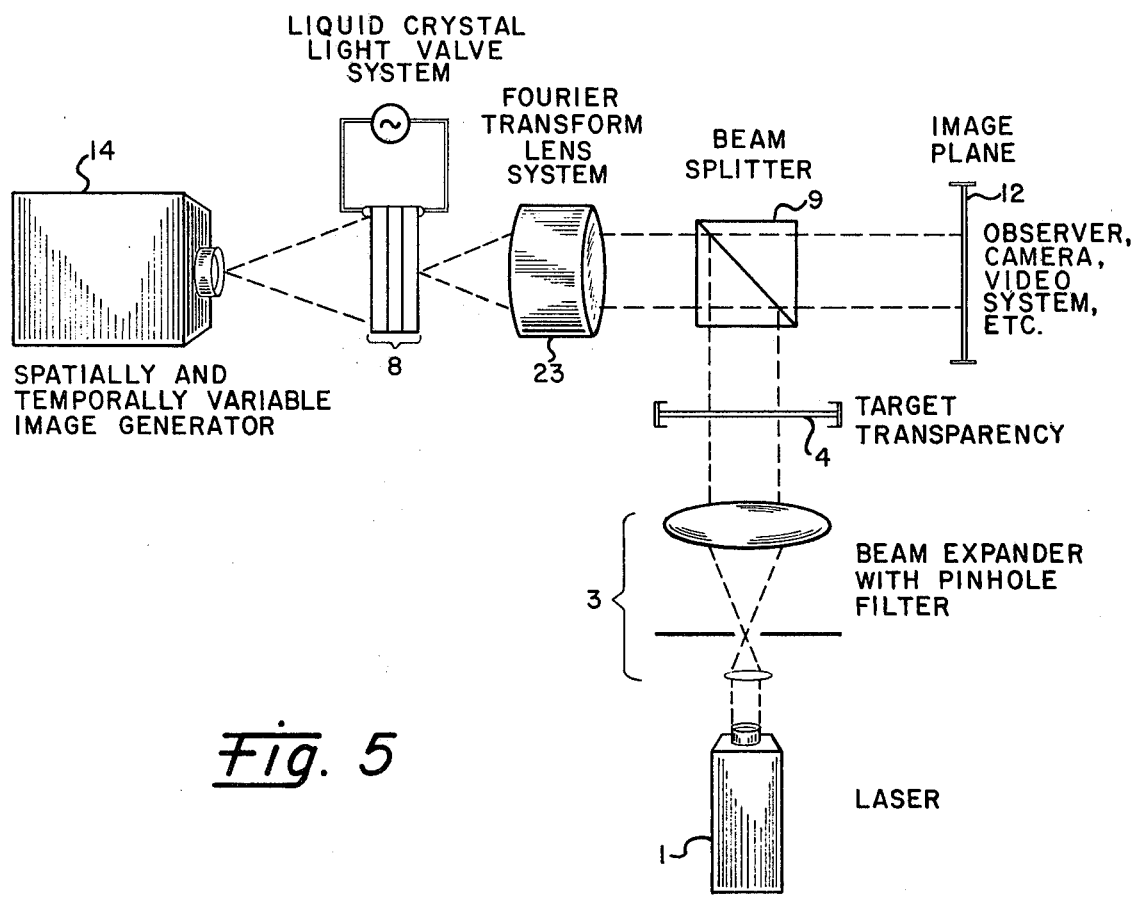

DYNAMIC BINARY FOURIER FILTERED IMAGING SYSTEM

RIGHTS OF THE GOVERNMENT

The invention described herein may be manufactured and used by or for the Government of the United States for all governmental purposes without the payment of any royalty.

BRIEF SUMMARY

The invention is directed to an optical apparatus for selectively filtering spatial frequencies from recorded patterns. A collimated beam of coherent light diffracts upon being projected through the target pattern. The diffraction interference pattern created is transformed into the Fourier domain by a lens system when focused on a planar surface whose reflectivity is spatially and temporally variable. The reflected portion of the beam incident on that surface is redirected to an image plane for real space observation, while the nonreflected areas are absorbed or incoherently dispursed.

The beam incident upon the variable reflectivity surface consists of the Fourier domain equivalent of the target pattern. The power spectral density as a function of spatial frequency appears as a corresponding function of the radial distance from the optical axis. Thus, selectively altering the radius of the reflective pattern on the variable reflectivity surface filters the spatial frequency content of the reflected portion of the beam. Upon redirection and conversion back into real space, the spatial frequency content of this reflection portion exhibits the effects of the filtering on the original target pattern.

A center spot, at the intersection of the optical axis with the variable surface, must always remain reflective. The zero spatial frequency reflected therefrom must be present to accurately reconstruct the real space image from the pattern in the Fourier domain.

A liquid crystal light valve system, illuminated on its controlling surface with a spatially and temporally variable image generator, has the resolution and the contrast levels necessary to fourier filter in the manner described. The reflective function is, however, binary in its operating states.

DESCRIPTION OF THE DRAWINGS

FIG. 5 contains a refined embodiment of the schematic configuration appearing in FIG. 1.

DETAILED DESCRIPTION

The escalating interest in performing comparative evaluations of visual acuteness in human beings and video systems has led those investigating the arts to analyze visually perceived patterns in terms of contrast and spatial frequencies. An inherent aspect of such investigations deals with evaluations of visual performance when standard patterns are selectively altered as to their spatial frequency composition. Heretofore, these variations in the spatial frequency content of visually observable images were not time variable.

The invention disclosed herein provides an apparatus which is capable of generating images whose spatial frequency content with respect to a fundamental pattern is temporally variable, using a filtering technique operative in the optical Fourier domain. Filter patterns interact with the target patterns while both are in the Fourier domain, selectively filtering, and thus altering, the spatial frequency content of the target pattern prior to its transformation back into real space.

Figure 1:
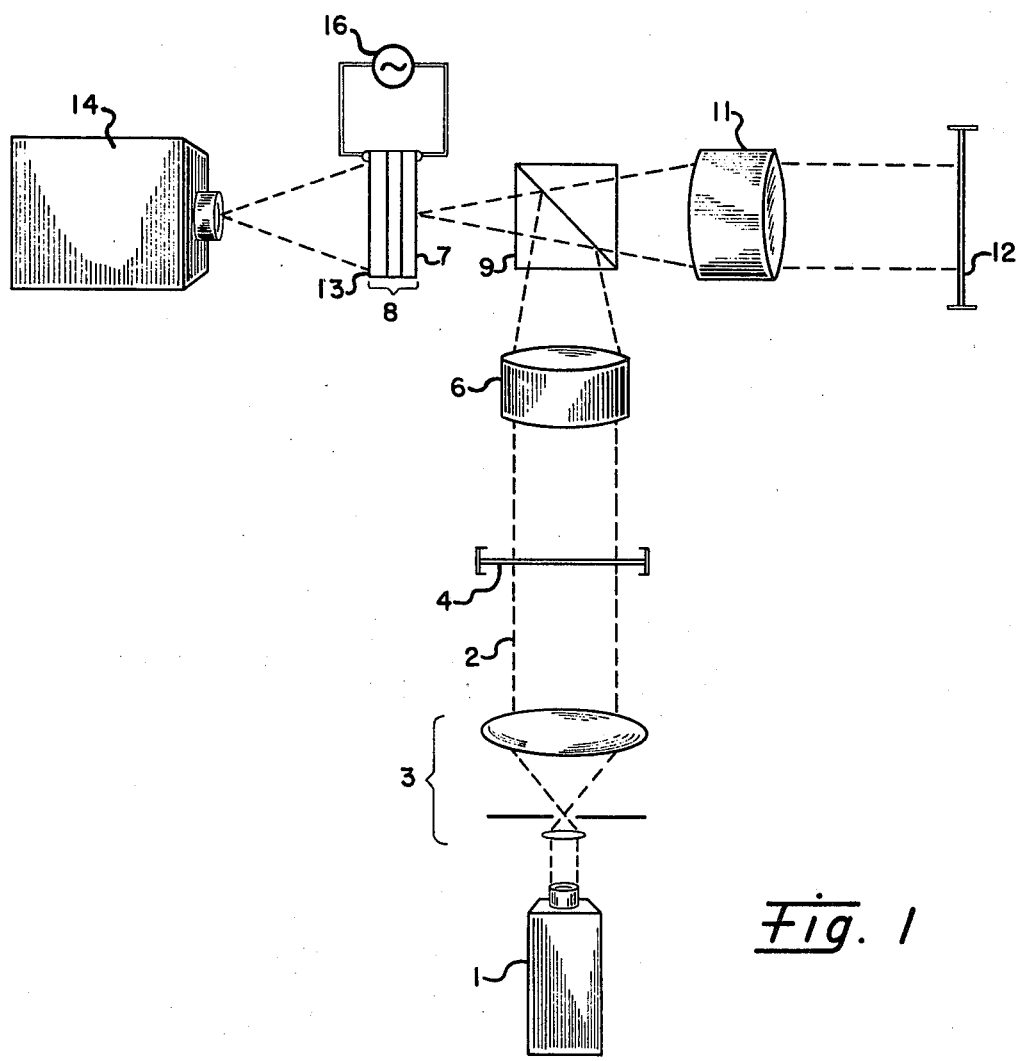
FIG. 1 is a schematic of the complete optical system.

To clearly understand the apparatus and its operation, attention is directed to an embodiment, depicted schematically in FIG. 1. The individual elements in the structure are, for the most part, commercially available pieces of hardware whose performance characteristics are within the purview of artisans recognizing the design constraints of the overall apparatus. Therefore, the individual elements will not be described in elaborate detail. The immediately succeeding paragraphs will enumerate the elements, while those following thereafter will focus on the functional aspects of the elements as a group.

Coherent luminous energy is supplied by laser 1 and collimated into broad beam 2 by expander filter assembly 3. In the path of the collimated beam is target transparency 4, containing the pattern to be analyzed. The coherent, diffractively patterned beam leaving transparency 4 is transformed into the Fourier domain upon passing through lens system 6, which may be a group of compensating lenses or a simple, single lens. Lens system 6 is selected and located so that the beam emerging therefrom is brought to a focus, representing the Fourier domain, on planar surface 7 of light valve 8 after partial reflection off beam splitter 9.

The areas of the luminous energy reflected from surface 7 reenter beam splitter 9. The portion of this reflected beam which projects directly through the beam splitter is transformed back into the real space by transform lens system 11. As embodied, lens system 11 is substantially identical to system 6, and in the location depicted recollimates the beam to project onto an image plane, 12. The pattern appearing at image plane 12 is observed directly by an individual or is provided as an input to an imaging system for more convenient viewing.

The opposite face, 13, of liquid crystal light valve 8 is selectively illuminated by a spatially and temporally variable image generator, 14, typically a zoom lens pattern projector or a motion picture projector. AC voltage source 16 supplies the power to translate luminous energy patterns appearing on surface 13 into liquid crystal reflective patterns on opposite surface 7 of light valve 8.

With an understanding of the constituent elements at hand, and a superficial description of their individual functions, the combined operation of the apparatus will now be described in detail.

Figure 2:
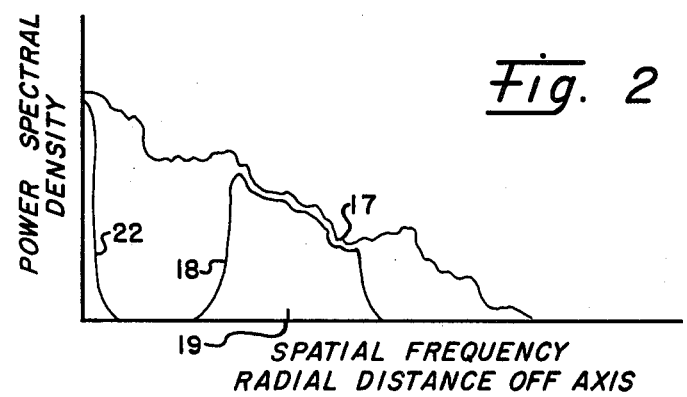
FIG. 2 contains various plots of power spectral density.

The collimated, coherent beam of luminous energy, 2, is altered by the opaque regions in the pattern of target transparency 4 of diffraction. The composite diffraction pattern created upon leaving the target is transformed into the Fourier domain by lens system 6 at surface 7 of the light valve, which is actually the Fraunhofer diffraction pattern of target 4. The power spectral density as a function of spatial frequency, for a typical target pattern, is shown as curve 17 in the graph of FIG. 2.

Creation of the Fraunhofer diffraction pattern on surface 7 is not distinctly useful until one recognizes that spatial frequency and radial distance off the optical axis of the diffraction pattern are related by a single coefficient. Thus, the abscissa of the power spectral density plot in FIG. 2 may also use a scale of radial units. At this point it is beneficial to recall that the real space image at plane 12 is a transformation by lens 11 of the Fourier domain pattern appearing on surface 7. When the concepts are merged, it becomes evident that the spatial frequency content of the observed image can be altered by selective modifications of the pattern projected onto surface 7.

At this point consider, briefly, the operating characteristics of liquid crystal light valve 8, and particularly those characteristics which alter the optical reflectivity of surface 7 to luminous energy projected from laser 1. These and other characteristics of this device are fully described in a technical article entitled "Application of the Liquid Crystal Light Valve to Real-Time Optical Data Processing" by coauthors W. P. Bleha et al. appearing in the July-August 1978 issue of Optical Engineering. For purposes of this invention, it is the mirror-like reflectivity of the pattern formed on surface 7 that performs the selective reflection which characterizes the spatial frequency filtering sought. The regions of the Fourier domain beam striking nonreflective areas of surface 7 are either absorbed or scattered incoherently. Thus, the pattern observed at image plane 12 represents an interaction between a patterned beam and a patterned reflective surface.

Drawing upon the performance characteristics of liquid crystal light valves, on one hand, and the above-described spatial filtering occurring at surface 7 of the light valve, on the other, one now recognizes that dynamic filtering is an inherent operating mode of this apparatus. By using a temporally variable luminous energy image generator, typically a motion picture projector, the apparatus can perform real-time scans of spatial frequencies and bandwidths.

Since liquid crystal light valves were conceived and designed with the object of optical data processing, their performance, in terms of resolution and modulation transfer function, is adequate for the apparatus depicted in FIG. 1. The binary aspect of the invention is attributable to the two state reflective characteristics of surface 7, in that present technology does not provide for creating regions of partial reflection. Undoubtedly, the invention recognizes such a refinement in the reflective characteristics of the device as a natural evolution of the light valve. A further beneficial aspect of the device lies in the gradation between mirrored and nonmirror areas as they appear on surface 7. Without it, deleterious diffraction effects from the liquid crystal itself would be introduced into the image reflected.

Figure 3:
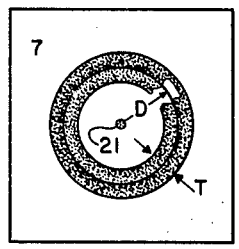
FIG. 3 contains a schematic of a donut shaped reflective area on the liquid crystal light valve.

At this point it is beneficial to consider an actual target and the interaction between patterns at liquid crystals light valve surface 7. Take a military vehicle, such as a tank, having the power spectral density shown by plot 17 in FIG. 2. If the investigator wishes to project only a spatial frequency band of the target, for instance band 18 about center frequency 19, he would project a donut shaped luminous energy image of the form appearing in FIG. 3 onto valve surface 13, taking care to ensure that center point 21 is in alignment with the optical axis of the system. Since spatial frequency and radial distance of the optical axis are proportional, and related by a fixed coefficient, the diameter, D, of the donut defines center frequency 19, while its thickness, T, prescribes the transmitted bandwidth.

Figure 4:
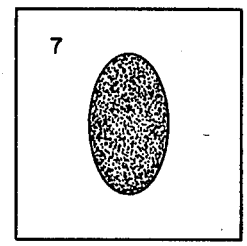
FIG. 4 is an elliptical variant to FIG. 3.

The reflective patterns created at surface 7 of the light valve are not restricted to axially symmetric shapes. Take, for instance, the ellipse appearing in FIG. 4. This low spatial frequency bandpass filter is asymmetric, having a vertically oriented band which is broader than the horizontally oriented band. Such an embodiment is useful in analyzing the effects of TV type video systems, in which the vertical and horizontal resolutions are limited by distinctly different performance constraints.

Irrespective of the filter shape selected, a reflective spot must appear on surface 7 at a point coincident with the optical axis. Functionally it provides the zero spatial frequency in the Fourier domain, which is itself a necessary constituent in the interference process leading to a real space image at plane 12. The spot may be created by light valve 8 or may be a permanent reflective area on surface 7. In general, it is small in comparative size so that the transmitted band is very narrow and substantially negligible in its effects on the image observed. A typical power spectral density plot for such a spot is shown by plot 22 in FIG. 2 of the drawings.

The beam splitter depicted in FIG. 1 is of a conventional form, in which the luminous energy is divided into approximately equal halves. The invention is, however, sufficiently broad to encompass other embodiments. One such embodiment increases the proportion of the laser energy reaching image plane 12 by utilizing a polarizer beam splitter. Liquid crystal light valve 8 is configured both to reflect areas of the incident beam and to rotate the polarization vector of the reflected segment. Thereby, the polarization characteristics of the beam splitter maximize the energy reaching image plane 12.

A further embodiment of the basic principles underlying the invention appears in FIG. 5. In this configuration the optical system has been compacted by using a single Fourier transform lens system, 23, for transformation both into and out of the Fourier domain. Not only is one costly lens system eliminated, but optical misalignments between the two lens systems in the embodiment of FIG. 1 are substantially minimized.

Undoubtedly those skilled in the art will recognize that the various embodiments of the invention shown and described herein are readily amenable to diverse refinements without departing from the scope and spirit of the invention contemplated and claimed.

We claim:

1. An apparatus for selectively and dynamically filtering the spatial frequencies in a pattern, comprising:
   a means for generating a collimated beam of coherent light;
   a means for creating a diffraction pattern in said beam;
   a Fourier transform lens system in the path of said patterned beam;
   a dynamic means for spatially and temporally varying the reflective characteristics of a surface at the focal plane of said Fourier transform lens system, said dynamic means having a continuously reflective area at the point corresponding to zero spatial frequency; and
   a means for redirecting the light, reflected off the surface of said dynamic means, onto an image plane.

* * * * *